US008604111B2

(12) United States Patent
Willberg et al.

(10) Patent No.: US 8,604,111 B2
(45) Date of Patent: *Dec. 10, 2013

(54) POLYMERIC ACID PRECURSOR COMPOSITIONS AND METHODS

(75) Inventors: Dean M. Willberg, Tucson, AZ (US); Carlos Abad, Richmond, TX (US); Marina Bulova, Moscow (RU); Dzanis Menshikau, Minsk (BY)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,132

(22) Filed: Apr. 24, 2012

(65) Prior Publication Data

US 2012/0208729 A1 Aug. 16, 2012

Related U.S. Application Data

(63) Continuation of application No. 11/562,026, filed on Nov. 21, 2006, now Pat. No. 8,163,826.

(51) Int. Cl.
*C04B 14/06* (2006.01)
*C04B 20/00* (2006.01)
*C04B 40/06* (2006.01)
*E01C 19/50* (2006.01)

(52) U.S. Cl.
USPC ........... 524/314; 524/556; 524/356; 524/293; 524/315; 524/609; 524/610

(58) Field of Classification Search
USPC .......... 524/314, 556, 356, 293, 315, 609, 610
See application file for complete search history.

(56) References Cited

U.S. PATENT DOCUMENTS

| | | | |
|---|---|---|---|
| 3,993,843 A * | 11/1976 | Vasta | 428/422 |
| 4,848,467 A | 7/1989 | Cantu et al. | |
| 4,957,165 A | 9/1990 | Cantu et al. | |
| 4,961,466 A | 10/1990 | Himes et al. | |
| 4,986,355 A | 1/1991 | Casad et al. | |
| 5,066,485 A * | 11/1991 | Brieva et al. | 424/63 |
| 5,258,461 A * | 11/1993 | Facci et al. | 525/165 |
| 5,502,158 A | 3/1996 | Sinclair et al. | |
| 6,207,620 B1 | 3/2001 | Gonzalez et al. | |
| 6,258,859 B1 | 7/2001 | Dahayanake et al. | |
| 6,538,164 B1 | 3/2003 | Gallagher et al. | |
| 8,163,826 B2 * | 4/2012 | Willberg et al. | 524/314 |
| 2004/0152601 A1 | 8/2004 | Still et al. | |
| 2004/0209780 A1 | 10/2004 | Harris et al. | |
| 2005/0059558 A1 | 3/2005 | Blauch et al. | |
| 2006/0096757 A1 | 5/2006 | Berry et al. | |
| 2006/0096758 A1 | 5/2006 | Berry et al. | |
| 2006/0292382 A1 | 12/2006 | Yamazaki et al. | |

FOREIGN PATENT DOCUMENTS

| | | |
|---|---|---|
| WO | 9406856 A1 | 3/1994 |
| WO | 03027431 A2 | 4/2003 |
| WO | 2006120422 A1 | 11/2006 |

OTHER PUBLICATIONS

Abrams, A., Scheuerman, R.F., Templeton, C.C., and Richardson, E.A., "Higher-ph Acid Stimulation Systems," SPE 7892, Journal of Petroleum Technology, Dec. 1983, vol. 35, No. 12, pp. 2175-2184.
Zhang, X., Wyss, U.P., Pichora, D., and Goosen, M.F.A., "An Investigation of Poly (Lactic Acid) Degradation, Journal of Bioactive and Compatible Polymers," XP-002480517, Jun. 11, 1994, Queens University, Kingston, Ontario, Canada.
Hansen, "Hansen's Solubility Parameter—A User's Guide," 2002, CRC Press, Chapter 1.
Lee, J.S., Lee, H.K., and Kim, S.C., "Thermodynamic Parameters of Poly (Lactic Acid) Solutions in Dialkyl Phthalate," Polymer, XP-002480518, 2004, vol. 45, Issue 13, pp. 4491-4498, Elsevier Science Ltd. ISSN: 0032-3861.

* cited by examiner

*Primary Examiner* — Mark Kaucher
(74) *Attorney, Agent, or Firm* — Matthieu Vandermolen; Tim Curington; Robin Nava

(57) ABSTRACT

A composition is formed from a polymeric acid precursor, such as polylactic acid (PLA), that is a least partially dissolved within a polymer dispersing solvent. An emulsion may be from polymeric acid precursor that is at least partially dissolved within a solvent and a liquid that is substantially immiscible with the solvent. In certain cases, the molecular weight of the polymeric acid precursor may be reduced in forming the solution. The solution may be used in treating a formation penetrated by a wellbore.

10 Claims, No Drawings

POLYMERIC ACID PRECURSOR COMPOSITIONS AND METHODS

This application claims priority as a continuation patent application of U.S. patent application Ser. No. 11/562,026, now U.S. Pat. No. 8,163,826, filed on Nov. 21, 2006, entitled "Polymeric Acid Precursor Compositions And Methods" which is hereby incorporated by reference in its entirety.

TECHNICAL FIELD

This invention relates to polymeric acid-precursors that generate acids under certain conditions. More particularly it relates to polyester materials that are capable of forming acids upon degrading, and their use, particularly in the treatment of subterranean formations.

BACKGROUND

Acid has been used in the past for treating subterranean formations. In acid fracturing treatments, for instance, acid is placed in the fracture, at a distance from the wellbore, where it reacts with the face of the fracture to etch differential flow paths in the fracture faces. Normally, the acid is placed in the desired location by forming an acidic fluid on the surface and pumping the acidic fluid from the surface and down the wellbore above fracture pressure. Problems can be encountered, however, when using these acidic fluids.

First, in the pumping operation the acid is in contact with iron-containing components of the wellbore such as casing, liner, coiled tubing, etc. Acids are corrosive to such materials, especially at high temperature. This means that corrosion inhibitors must be added to the fluid being injected in order not to limit the amount of acid, and/or the time of exposure, that can be used during injection of an acid. Furthermore, acid corrosion creates iron compounds such as iron chlorides. These iron compounds may precipitate, especially if sulfur or sulfides are present, and may interfere with the stability or effectiveness of other components of the fluid, thus requiring addition of iron control agents or iron sequestering agents to the fluid.

Second, if the intention is to use the acid to treat a part of the formation at a significant distance away from the wellbore, this may be very difficult to accomplish because the acid will tend to react with the first reactive material with which it comes into contact. This may result in the acid reacting with materials closer to the wellbore and before the acid is in the desired position. Moreover, subterranean formations where the acid is used are typically high temperature environments and the higher the temperature the more reactive the acid is.

There have been several ways in which operators have dealt with these problems in the past. One method is to segregate the acid from the material with which reaction is not desired. This is done, for example, by a) placing the acid in the internal phase of an emulsion (so-called "emulsified acid") and then either causing or allowing the emulsion to invert at the time and place where reaction is desired or allowing slow transport of the acid across the phase boundaries, or b) encapsulating the acid, for example by the method described in U.S. Pat. No. 6,207,620, and then releasing the acid when and where it is needed. There are problems with these methods, however. Although conventional emulsified acids are popular and effective, they require additional additives and specialized equipment and expertise, and may be difficult to control. Furthermore, as they tend to be "oil external phase" emulsions, the friction pressure associated with pumping these fluids tends to be relatively high. A problem with the encapsulated acids is that the location and timing of release of the acid may be difficult to control. The release is brought about by either physical or chemical degradation of the coating. Physical damage to the encapsulating material, or incomplete or inadequate coating during manufacture, could cause premature release of the acid.

A second method is to delay formation of the acid. Templeton, et al., in "Higher pH Acid Stimulation Systems", SPE paper 7892, 1979, described the hydrolysis of esters such as methyl formate and methyl acetate as in situ acid generators in the oilfield. They also described the reaction of ammonium monochloroacetic acid with water to generate glycolic acid and ammonium chloride in the oilfield. However, these "acid precursors" are liquids, and these reactions take place very rapidly as soon as the "acid precursors" contact water.

More recently, the delayed formation of acid by the use of solid "polymeric acid precursors," such as polylactic acid, has been developed wherein the solid polymeric acid precursor is injected into the formation and is allowed to hydrolyze so that "monomeric acids" are released at controllable rates. The use of such solid polymeric acid precursors is described in U.S. Patent Publication No. 2004/0152601A1, which is herein incorporated by reference in its entirety.

SUMMARY

One embodiment is a composition including an amount of a polymeric acid precursor at least partially dissolved within a polymer dispersing solvent. In various aspects of this embodiment: the composition further includes a liquid that is substantially immiscible with the solvent; the composition further includes at least one of a surfactant and a steric stabilizer; the surfactant has a hydrophile-lipophile balance of from about 6 to about 35; the solvent includes an ester that degrades to at least one of carboxylic acids, dicarboxylic acids and polycarboxylic acids; the solvent is at least one of a dibasic ester, a monobasic ester, a ketone, an ether, and a non-aliphatic dicarboxylic acid ester, and combinations of these; the solvent includes at least one of dimethyloxalate, dimethyl ester of propanedioic acid, dimethyl maleate, dimethyl malonate, dimethyl succinate, dimethyl glutarate and dimethyl adipate; the solvent has an absolute difference of Hildebrand solubility parameter with the polymeric acid precursor that is less than about 5 $MPa^{1/2}$, for example the solvent has an absolute difference of Hildebrand solubility parameter with the polymeric acid precursor that is less than about 3 $MPa^{1/2}$, for example the solvent has an absolute difference of Hildebrand solubility parameter with the polymeric acid precursor that is less than about 1 $MPa^{1/2}$; the solvent has an absolute difference of the Hansen polar solubility parameter with the polymeric acid precursor of less than about 5 $MPa^{1/2}$ and an absolute difference of the Hansen hydrogen bonding solubility parameter with the polymeric acid precursor of less than about 5 $MPa^{1/2}$ and an absolute difference of the Hansen dispersive solubility parameter with the polymeric acid precursor of less than about 5 $MPa^{1/2}$, for example the solvent has an absolute difference of the Hansen polar solubility parameter with the polymeric acid precursor of less than about 3 $MPa^{1/2}$ and an absolute difference of the Hansen hydrogen bonding solubility parameter with the polymeric acid precursor of less than about 3 $MPa^{1/2}$ and an absolute difference of the Hansen dispersive solubility parameter with the polymeric acid precursor of less than about 3 $MPa^{1/2}$, for example the solvent has an absolute difference of the Hansen polar solubility parameter with the polymeric acid precursor of less than about 1 $MPa^{1/2}$ and an absolute difference of the Hansen hydrogen bonding solubility parameter with the polymeric acid precursor of less than about 1 MPa$^{1/2}$ and an absolute difference of the Hansen dispersive solubility parameter with the polymeric acid precursor of less than about 1 MPa$^{1/2}$; the solvent has a solubility distance, Ra, with respect to the polymeric acid precursor that is less than 1.1 times the solubility sphere radius, Ro, of the polymeric acid precursor, for example the solvent has a solubility distance, Ra, with respect to the polymeric acid precursor that is less than 0.8 times the solubility sphere radius, Ro, of the polymeric acid precursor, for example the solvent has a solubility distance, Ra, with respect to the polymeric acid precursor that is less than 0.5 times the solubility sphere radius, Ro, of the polymeric acid precursor; the polymeric acid precursor includes at least one of homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate and ethylenenaphthalate and combinations of these; the solvent is at least one of dimethyloxalate, dimethyl ester of propanedioic acid, dimethyl maleate, dimethyl malonate, dimethyl succinate, dimethyl glutarate, dimethyl adipate and mixtures thereof; the polymeric acid precursor is present within the solvent in an amount of from greater than 0% to less than 100% by weight of polymeric acid precursor/solvent solution; the polymeric acid precursor is present within the solvent in an amount of from about 10% to about 60% by weight of polymeric acid precursor/solvent solution; and the solid polymeric acid precursor includes an amorphous solid.

Another embodiment is a composition including an emulsion formed from a polymeric acid precursor at least partially dissolved within a solvent and a liquid that is substantially immiscible with the solvent. In various aspects of this embodiment: the solvent is at least one of a dibasic ester, a monobasic ester, a ketone, an ether, and a non-aliphatic dicarboxylic acid ester, and combinations of these; the liquid forms an external phase of the emulsion and the polymeric acid precursor/solvent solution forms an internal phase of the emulsion; the polymeric acid precursor/solvent solution forms an external phase of the emulsion and the liquid forms an internal phase of the emulsion; the composition further includes at least one of a surfactant and a steric stabilizer; the surfactant is selected from at least one of quaternary ammonium salts, betaines, sulfobetaines, sulfonates, sulfates, amineoxides, fatty acids, fatty acid salts, amine oxides, polypropylene glycol and derivatives, ethoxylated surfactants and combinations of these; the solvent is at least one of dimethyloxalate, dimethyl ester of propanedioic acid, dimethyl maleate, dimethyl malonate, dimethyl succinate, dimethyl glutarate, dimethyl adipate and mixtures thereof; the surfactant has a hydrophile-lipophile balance of from about 6 to about 35; the polymeric acid precursor includes at least one of homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate and ethylenenaphthalate and combinations of these; the polymeric acid precursor is present within the solvent in an amount of from greater than 0% to less than 90% by weight of polymeric acid precursor/solvent solution; the solid polymeric acid precursor includes an amorphous solid; the immiscible liquid is aqueous; the emulsion is stabilized with at least one of block copolymers of propylene and ethylene, ethylene oxide, propylene oxide, polysaccharides, polyvinyl acetate/alcohol copolymers, styrene maleic anhydride copolymers, amphiphilic polymers and combinations thereof; the emulsion is stabilized by addition of a base capable of neutralizing terminal carboxylic acid groups of the polymer; the aqueous liquid is viscosified; the emulsion further includes a non-liquid phase of a gas or a super critical fluid; the non-liquid phase includes at least one of nitrogen and carbon dioxide; the aqueous liquid includes at least one of a mineral acid, an organic acid, an organic acid precursor, a base, a base precursor, an oxidizer, an enzyme, a chelating agent, a crosslinking agent, and an inorganic salt; and the emulsion further includes at least one of waxes, fibers, carbonate materials, bicarbonate materials, bentonite materials, thermoplastic or thermosetting polymer pellets, fibers or grains, glass bubbles, minerals, ceramic materials, wood, chestnut or walnut crust, sand, proppant, bauxite, or resin coated particles.

Yet another embodiment is a method of forming a composition including: at least partially dissolving a solid polymeric acid precursor in a solvent of at least one of a dibasic ester and acetone to form a polymeric acid precursor/solvent solution. In various aspects, this embodiment includes: reducing the molecular weight of the solid polymeric acid precursor by treating the polymeric acid precursor with a molecular weight reducing agent; forming an emulsion from a mixture of the dissolved polymeric acid precursor/solvent solution and a liquid that is substantially immiscible with the solvent; and reducing the molecular weight of the polymeric acid precursor is achieved by at least one of transesterfication and ester hydrolysis. In further aspects, the molecular weight reducing agent is selected from at least one of an acid and an acid precursor; the molecular weight reducing agent is selected from at least one of a base and a base precursor; the molecular weight reducing agent is selected from at least one of a mineral acid, sulfuric acid, hydrochloric acid, phosphoric acid, paratoluene sulphonic acid, methane sulphonic acid, an organic acid, acetic acid, formic acid, oxalic acid, benzoic acid, an ion exchange resin, a styrene sulphonic acid copolymer, a vinyl sulfonic acid copolymer, an acid clay, sodium hydroxide, ammonia, ammonium hydroxide, ammonium carbonate, hexamethylene tetramine (HMTA), triethanolamine, sodium carbonate, sodium bicarbonate, a secondary amine, a tertiary amine, an anhydride, maleic anhydride, phthalic anhydride, titanium tetraisopropoxyde, titanium tetraphenoxide, methanol, ethanol, isopropanol, and a sterically unhindered alcohol; the solvent is at least one of a dibasic ester, a monobasic ester, a ketone, an ether, and a non-aliphatic dicarboxylic acid ester, and combinations of these; the solvent includes at least one of dimethyloxalate, dimethyl ester of propanedioic acid, dimethyl maleate, dimethyl malonate, dimethyl succinate, dimethyl glutarate and dimethyl adipate; the solid polymeric acid precursor includes an amorphous solid; the polymeric acid precursor/solvent forms an internal phase of the emulsion; the polymeric acid precursor includes at least one of homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate and ethylenenaphthalate and combinations of these; the emulsion contains at least one of a surfactant and a steric stabilizer; the surfactant has a hydrophile-lipophile balance of from about 6 to about 35; the surfactant is selected from at least one of quaternary ammonium salts, betaines, sulfonates, sulfates, amineoxides, fatty acids, fatty acid salts, amine oxides, polypropylene glycol and derivatives, ethoxylated surfactants and combinations of these; the emulsion is stabilized with at least one of block copolymers of propylene and ethylene, ethylene oxide, propylene oxide, polysaccharides; polyvinyl acetate/alcohol copolymers, styrene maleic anhydride copolymers, amphiphilic polymers and combinations thereof; the emulsion is stabilized by addition of a base capable of neutralizing terminal carboxylic acid groups of the polymeric acid precursor; the polymeric acid precursor is present within the solvent in an amount of from greater than 0% to less than 100% by weight of polymeric acid precursor/solvent solution; the liquid forms an external phase of the emulsion and the polymeric acid precursor/solvent solution forms an internal phase of the emulsion; the polymeric acid precursor/solvent solution forms an external phase of the emulsion and the liquid forms an internal phase of the emulsion; the immiscible liquid is aqueous; and the solution is viscosified. In other variations, the method includes forming the emulsion further includes forming a non-liquid phase by combining a gas, super critical fluid or gas forming component with the solution/liquid mixture; the non-liquid phase includes at least one of nitrogen and carbon dioxide; the aqueous liquid includes at least one of a mineral acid, an organic acid, an organic acid precursor, a base, a base precursor, an oxidizer, an enzyme, a chelating agent, a crosslinking agent, and an inorganic salt; and the emulsion further includes at least one of waxes, fibers, carbonate materials, bicarbonate materials, bentonite materials, thermoplastic or thermosetting polymer pellets, fibers or grains, glass bubbles, minerals, ceramic materials, wood, chestnut or walnut crust, sand, proppant, bauxite, and resin coated particles.

A further embodiment is a method of forming a composition including: reducing the molecular weight of a solid polymeric acid precursor by treating the polymeric acid precursor with a molecular weight reducing agent; at least partially dissolving the reduced molecular weight polymeric acid precursor in a solvent; and forming an emulsion from a mixture of the dissolved polymeric acid precursor/solvent solution and a liquid that is substantially immiscible with the solvent. In various aspects of this embodiment, are included reducing the molecular weight of the polymeric acid precursor is achieved by at least one of transesterfication and ester hydrolysis, in which the molecular weight reducing agent is selected from at least one of an acid and an acid precursor; the molecular weight reducing agent is selected from at least one of a base and a base precursor; the molecular weight reducing agent is selected from at least one of a mineral acid, sulfuric acid, hydrochloric acid, phosphoric acid, paratoluene sulphonic acid, methane sulphonic acid, an organic acid, acetic acid, formic acid, oxalic acid, benzoic acid, an ion exchange resin, a styrene sulphonic acid copolymer, a vinyl sulfonic acid copolymer, an acid clay, sodium hydroxide, ammonia, ammonium hydroxide, ammonium carbonate, hexamethylene tetramine (HMTA), triethanolamine, sodium carbonate, sodium bicarbonate, a secondary amine, a tertiary amine, an anhydride, maleic anhydride, phthalic anhydride, titanium tetraisopropoxide, titanium tetraphenoxide, methanol, ethanol, isopropanol, and a sterically unhindered alcohol; the solvent is at least one of a dibasic ester, a monobasic ester, a ketone, an ether, and a non-aliphatic dicarboxylic acid ester, and combinations of these; the solvent includes at least one of dimethyloxalate, dimethyl ester of propanedioic acid, dimethyl maleate, dimethyl malonate, dimethyl succinate, dimethyl glutarate and dimethyl adipate; the solid polymeric acid precursor is amorphous; the polymeric acid precursor/solvent forms an internal phase of the emulsion; the polymeric acid precursor includes at least one of homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate and ethylenenaphthalate and combinations of these; the emulsion contains at least one of a surfactant and a steric stabilizer; the surfactant has a hydrophile-lipophile balance of from about 6 to about 35; the surfactant is selected from at least one of quaternary ammonium salts, betaines, sulfobetaines, sulfonates, sulfates, amineoxides, fatty acids, fatty acid salts, amine oxides, polypropylene glycol and derivatives, ethoxylated surfactants and combinations of these; the emulsion is stabilized with at least one of 1,1-dichloroethylene, propylene/ethylene block copolymers, polysaccharide, polyvinyl acetate/alcohol copolymers and styrene maleic anhydride; the emulsion is stabilized by addition of a base capable of neutralizing terminal carboxylic acid groups of the polymeric acid precursor; the polymeric acid precursor is present within the solvent in an amount of from greater than 0% to less than 100% by weight of polymeric acid precursor/solvent solution; the liquid forms an external phase of the emulsion and the polymeric acid precursor/solvent solution forms an internal phase of the emulsion; the polymeric acid precursor/solvent solution forms an external phase of the emulsion and the liquid forms an internal phase of the emulsion; the immiscible liquid is aqueous; the solution is viscosified; forming the emulsion further includes forming a non-liquid phase by combining a gas, super critical fluid or gas forming component with the solution/liquid mixture; the non-liquid phase includes at least one of nitrogen and carbon dioxide; the aqueous liquid includes at least one of a mineral acid, an organic acid, an organic acid precursor, a base, a base precursor, an oxidizer, an enzyme, a chelating agent, a crosslinking agent, and an inorganic salt; and the emulsion further includes at least one of waxes, fibers, carbonate materials, bicarbonate materials, bentonite materials, thermoplastic or thermosetting polymer pellets, fibers or grains, glass bubbles, minerals, ceramic materials, wood, chestnut or walnut crust, sand, proppant, bauxite, and resin coated particles.

A further embodiment is a method of treating a formation penetrated by a wellbore including: at least partially dissolving a solid polymeric acid precursor in a polymer dispersing solvent to form a polymeric acid precursor/solvent solution, and optionally combining the polymeric acid precursor/solvent solution with a substantially immiscible liquid to form an emulsion; and introducing the solution or emulsion into the wellbore of the formation. Aspects include reducing the molecular weight of the solid polymeric acid precursor by treating the polymeric acid precursor with a molecular weight reducing agent prior to dissolving the solid polymeric acid precursor. In other aspects the solution or emulsion is introduced into the wellbore through tubing, selected from coiled tubing and jointed tubing, positioned within the wellbore; the solution or emulsion is introduced into the wellbore through an annular space between the wellbore wall and tubing, selected from coiled tubing and jointed tubing, positioned within the wellbore; the solution or emulsion is introduced into the wellbore through tubing, selected from coiled tubing and jointed tubing, positioned within the wellbore, while another fluid is introduced into an annular space between the wellbore wall and the tubing positioned within the wellbore; the solution or emulsion is introduced into the wellbore through an annular space between the wellbore wall and tubing, selected from coiled tubing and jointed tubing, positioned within the wellbore, while another fluid is introduced into the wellbore through the tubing; and the solution or emulsion is introduced into the wellbore of the formation for at least one of an acidizing treatment, a fracturing treatment, a squeeze treatment, an acid fracturing treatment, a gravel packing treatment, use as a fracturing fluid, use as a gravel packing fluid, use as a fluid in acid fracturing, use as a fluid loss agent, use as a diverting agent, use as a temporary plugging agent, use as a fluid loss system, use as a combined fluid loss and matrix breaker treatment system, use in cleaning oil based drilling fluids, use in cleaning the wellbore, use as an acid delivery fluid for matrix acidizing, use as an acid delivery fluid for acid fracturing, use as an additive that functions as a breaker, use as a carrier for scale inhibitors, use as a carrier for crosslinking agents and use as a delayed release mechanism.

Another embodiment is a method of treating a subterranean formation penetrated by a wellbore including: forming an emulsion of a dibasic ester with a liquid that is substantially immiscible with the dibasic ester; and introducing the emulsion into the wellbore to facilitate treatment of the formation.

DETAILED DESCRIPTION

Solutions of certain polymer materials, which are capable of generating acids upon degradation, can be prepared using certain solvents. Moreover, emulsions may be formed from these solutions. Both the solution itself and the emulsions formed from these solutions may be used in treating subterranean formations and for other applications wherein "monomeric organic acid" is generated upon degradation of the dissolved polyester material.

These polymer materials are herein referred to as "polymeric acid precursors." These materials are typically solids at room temperature. The polymeric acid precursor materials include the polymers and oligomers that hydrolyze or degrade in certain chemical environments under known and controllable conditions of temperature, time and pH to release organic acid molecules that, as in the foregoing, are referred to as "monomeric organic acids." As used herein, the expression "monomeric organic acid" or "monomeric acid" may also include dimeric acid or acid with a small number of linked monomer units that function similarly, for purposes of the invention described herein, to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxybutyric acid, referred to as polyhydroxybutyrate; 2-hydroxyvaleric acid, referred to as polyhydroxyvalerate; epsilon caprolactone, referred to as polyepsilon caprolactone or polycaprolactone; the polyesters obtained by esterification of hydroxyl aminoacids such as serine, threonine and tyrosine; and the copolymers obtained by mixtures of the monomers listed above. A general structure for the above-described homopolyesters is:

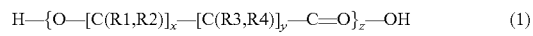

$$H-\{O-[C(R1,R2)]_x-[C(R3,R4)]_y-C=O\}_z-OH \qquad (1)$$

where,

R1, R2, R3, R4 is either H, linear alkyl, such as $CH_3$, $CH_2CH_3$ $(CH_2)_n CH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;

y is an integer between 0 and 10; and z is an integer between 2 and 50,000.

In the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor(s) appreciate and understand that any and all data points within the range are to be considered to have been specified, and that the inventor(s) have possession of the entire range and all points within the range.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120 to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

In the present invention, amorphous polymers may be particularly useful because they are more readily dissolved than crystalline polymers within the solvents described herein. An example of a suitable commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acyl chloride, malonyl chloride, fumaroyl chloride, maleyl chloride, succinyl chloride, glutaroyl chloride, adipoyl chloride, phthaloyl chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of the most simple case one can encounter, the general structure for the linear homopolyesters of the invention is:

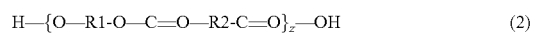

$$\mathrm{H{-}\{O{-}R1{-}O{-}C{=}O{-}R2{-}C{=}O\}_z{-}OH} \qquad (2)$$

where,

R1 and R2, are linear alkyl, branched alkyl, aryl, alkylaryl groups; and z is an integer between 2 and 50,000.

Other examples of suitable polymeric acid precursors are the polyesters derived from phthalic acid derivatives such as polyethylenetherephthalate (PET), polybutylentherephthalate (PBT), polyethylenenaphthalate (PEN), and the like.

In the appropriate conditions (pH, Temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

The solvents used for dissolving the polymeric acid precursors are herein referred to as "polymer dispersing solvents" or "dispersing solvents." The polymer dispersing solvent may be any solvent that is capable of dispersing the polymeric acid precursor polymer molecules into a dispersed mixture of the polymer molecules within the solvent, as is more fully described below, and which does not tend to readily degrade or depolymerize the polymers themselves to their monomeric organic acids during the dissolution process. These solvents are organic solvents; in particular, organic solvents such as dibasic esters have been found to be particularly useful as the polymer dispersing solvent. The dibasic esters may be selected to provide a high solubility for the polymeric acid precursor and to provide a low miscibility with water, if the solution is to be used in an emulsion as discussed later on. Examples of suitable dibasic esters include dimethyl succinate (DBE-4), dimethyl glutarate (DBE-5), dimethyl adipate (DBE-6), and mixtures of these. Other suitable solvents are those dibasic esters of longer alkyl chain lengths, such as ethyl, propyl, butyl, hexyl, 2-ethylhexyl, phenyl and others. Other non-aliphatic dicarboxylic acid esters are also suitable, particularly for higher temperature applications, such as dimethylphthalate, diethylphthalate, dibutylphthalate, bis-2-ethylhexylphthalate, bisdodecylphthalate, and the like.

Additionally, some ketones, such as acetone, methylethyl ketone (MEK), methylisobutyl ketone (MIBK) and others, and some monobasic acid esters, such as ethyl acetate (EtOAc), methyl acetate, methyl formate, ethylformate, butyl acetate, and some ethers, such as diethylether and methylethyl ether, may be used as the polymer dispersing solvents. Other monobasic or dibasic acid esters with other alcohol chains such as longer linear or branched alkyl chains (C2-C24) such as ethyl, propyl, butyl, 2-ethyl hexyl, dodecyl, lauryl, steraryl, palmitoyl, tetradecyl, cocoalkyl, octadecyl, oleyl, linoleyl, linolenyl, tridecyl, undecyl, erudecyl, or aryl chains, such as phenyl, alykylphenyl or cycloalkyl chains, such as cyclohexyl, cyclopentyl, may also be suitable for some applications.

Other suitable polymer dispersing solvents can be specifically found for each polymeric acid precursor. The selection of appropriate polymer dispersing solvents can be purely empirical or can be achieved by some simple rules such as those provided by the well known Hildebrand and or Hansen Solubility Parameter schemes. Values of the different solubility parameters for polymers and solvents of interest can be found in multiple sources in the literature; of particular use are Hansen Solubility Parameters, a user Handbook, Charles Hansen, CRC Press, 2000.

Following the "Hildebrand Solubility Parameter" scheme, by matching the solvent Hildebrand solubility parameter ($\delta^S$) to the polymer Hildebrand solubility parameter ($\delta^P$), suitable polymer dispersing solvents for the polymeric acid precursor can be found. In practice, matching Hildebrand solubility parameters $\delta^S$ and $\delta^P$ means calculating the absolute difference of Hildebrand solubility parameter of the solvent with respect to the polymer (absolute value of $\delta^S - \delta^P$). Solvents whose "absolute difference of Hildebrand solubility parameter" with the polymer is less than 5 MPa$^{1/2}$ are appropriate polymer dispersing solvents for a given polymeric acid precursor. Solvents whose absolute difference of Hildebrand solubility parameter with the polymer is less than 3 MPa$^{1/2}$ may provide a suitable polymer dispersing solvent for a given polymeric acid precursor. Solvents whose absolute difference of Hildebrand solubility parameter with the polymer is less than 1 MPa$^{1/2}$ may be particularly well suited as the polymer dispersing solvent for a given polymeric acid precursor.

The Hansen solubility parameter scheme is a more elaborate solvent selection method, which compares three different components of the solvent. The solvent Hansen polar solubility parameter ($\delta_P^S$), the solvent Hansen hydrogen bonding solubility parameter ($\delta_H^S$) and the solvent Hansen dispersive solubility parameter ($\delta_D^S$) are compared to the polymer Hansen polar solubility parameter ($\delta_P^P$), the polymer Hansen hydrogen bonding solubility parameter ($\delta_H^P$) and the polymer Hansen dispersive solubility parameter($\delta_D^P$), respectively. In addition, a "solubility distance" Ra, is compared to a "solubility sphere radius", Ro, which is a property of the polymer. The "solubility distance" is calculated as the square root of a certain linear combination of the squared differences of the three parameters between the solvent and polymer as:

$$Ra^2 = (\delta_P^S - \delta_P^P)^2 + (\delta_H^S - \delta_H^P)^2 + 4(\delta_D^S - \delta_D^P)^2 \quad (3)$$

The "solubility sphere radius", Ro defines the radius of a boundary sphere in the three dimensional Hansen Solubility Parameter space which separates good and bad solvents for the polymer of choice. Values of $\delta_P^P$, $\delta_H^P$, $\delta_D^P$, and Ro are known for the majority of the commercial polymers and are often available from the polymer suppliers or can be found in literature. Values of $\delta_P^S$, $\delta_H^S$, $\delta_D^S$, are known for a huge selection of solvents; of particular use are those values found in "Hansen Solubility Parameters, a user Handbook", Charles Hansen, CRC Press, 2000. For those solvents with $\delta_P^S$, $\delta_H^S$, $\delta_D^S$ values are not available, good estimates can be obtained using group contribution methods.

In practice, matching of Hansen solubility parameters means calculating the three absolute differences of the solvent solubility parameter with respect to the polymer for each of the three components. The three are (1) the absolute difference of the Hansen polar solubility parameter (absolute value of $\delta_P^S - \delta_P^P$); (2) the absolute difference of the Hansen hydrogen bonding solubility parameter (absolute value of $\delta_H^S - \delta_H^P$); and (3) the absolute difference of the Hansen dispersive solubility parameter (absolute value of $4 \times [\delta_D^S - \delta_D^P]$). It should be noted that for the last definition a multiplying factor of 4 is commonly used. Solvents where the (absolute value of $\delta_P^S - \delta_P^P$) is less than 5 MPa$^{1/2}$ and where (absolute value of $\delta_H^S - \delta_H^P$) is less than 5 MPa$^{1/2}$ and where (absolute value of $4 \times [\delta_D^S - \delta_D^P]$) is less than 5 MPa$^{1/2}$ may be suitable polymer dispersing solvents for a given polymeric acid precursor. Solvents where the (absolute value of $\delta_P^S - \delta_P^P$) is less than 3 MPa$^{1/2}$ and where (absolute value of $\delta_H^S - \delta_H^P$) is less than 3 MPa$^{1/2}$ and where (absolute value of $4 \times [\delta_D^S - \delta_D^P]$) is less than 3 MPa$^{1/2}$ may be particularly suitable polymer dispersing solvent for a given polymeric acid precursor. Solvents where the (absolute value of $\delta_P^S - \delta_P^P$) is less than 1 MPa$^{1/2}$ and where the (absolute value of $\delta_H^S - \delta_H^P$) is less than 1 MPa$^{1/2}$ and where the (absolute value of $4 \times [\delta_D^S - \delta_D^P]$) is less than 1 MPa$^{1/2}$ may be still more particularly suited as the polymer dispersing solvent for a given polymeric acid precursor.

The suitability of a solvent to become a polymer dispersing solvent for a particular polymeric acid precursor can also be ascertained by calculating the "solubility distance", Ra, between solvent and polymer as described earlier. This is matched to the "solubility sphere radius", Ro of the polymer as found in literature. In practice, solvents whose "solubility distance", Ra with respect to a given polymeric acid precursor is not higher than 1.1 times, more particularly 0.8 times, and still more particularly 0.5 times, the "solubility sphere radius", Ro of the polymer may be suitable as the polymer dispersing solvent for the polymeric acid precursor.

As an example, values of $\delta_P^S$, $\delta_H^S$, $\delta_D^P$, and Ro of 9.70 MPa$^{1/2}$, 6.00 MPa$^{1/2}$, 18.50 MPa$^{1/2}$, and 10.50 MPa$^{1/2}$ respectively, have been reported for polylactic acid by Agrawal Abhishek; Saran Amit D.; Rath Swagat S.; and Khanna Ashok in Polymer, 2004, vol. 45, n 25, pp. 8603-8612. Dimethyl succinate, whose values of $\delta_P^S$, $\delta_H^S$, $\delta_D^S$ are 5.30 MPa$^{1/2}$, 7.20 MPa$^{1/2}$, 15.00 MPa$^{1/2}$, respectively, as reported by Nelson on "Dispersing powders in liquids, part 2", R. D. Nelson Jr., ERTP 2002 and Hansen on "Hansen Solubility Parameters, a user Handbook", Charles Hansen, CRC Press, 2000, may be a suitable polymer dispersing solvent for polylactic acid. Ethyl acetate, whose values of $\delta_P^S$, $\delta_H^S$, $\delta_D^S$ are 5.30 MPa$^{1/2}$, 7.40 MPa$^{1/2}$, 16.60 MPa$^{1/2}$, respectively, as reported by Hansen on "Hansen Solubility Parameters, a user Handbook", Charles Hansen, CRC Press, 2000, may be a suitable polymer dispersing solvent for polylactic acid. In addition, dimethyl phthalate, whose values of $\delta_P^S$, $\delta_H^S$, $\delta_D^S$ are 10.80 MPa$^{1/2}$, 4.90 MPa$^{1/2}$, 18.60 MPa$^{1/2}$ as reported by Hansen on "Hansen Solubility Parameters, a user Handbook" Charles Hansen, CRC Press, 2000, may also be a suitable polymer dispersing solvent for polylactic acid. In the examples, it can be easily verified that the "solubility distance" for suitable polymer dispersing solvents with respect to polylactic acid, such as dimethyl succinate, ethyl acetate or dimethyl phthalate is 4.99 MPa$^{1/2}$, 8.35 MPa$^{1/2}$ and 1.43 MPa$^{1/2}$, respectively, values all of them are lower than the Ro value for polylactic acid of 10.50 MPa$^{1/2}$.

Suitable polymer dispersing solvents for a given polymeric acid precursor can be mixtures of two or more miscible solvents. Such miscible solvents form a single liquid phase. Suitable mixtures of solvents can be selected as the polymer dispersing solvent for a given polymeric acid precursor using the Hansen Solubility Parameters, that are additive on the volume fraction of each solvent in the mixture. For a mixture of miscible solvents, each "i" of them in a volume fraction $\Phi_i$, having Hansen solubility parameters $\delta_{P,i}^S$, $\delta_{H,i}^S$, $\delta_{D,i}^S$, the mixture solubility parameters $\delta_{P,M}^S$, $\delta_{H,M}^S$ and $\delta_{D,M}^S$ are as follows:

$$\delta_{P,M}^S = \sum_i \Phi_i \delta_{P,i}^S \quad (4)$$

$$\delta_{H,M}^S = \sum_i \Phi_i \delta_{H,i}^S \quad (5)$$

$$\delta_{D,M}^S = \sum_i \Phi_i \delta_{D,i}^S \quad (6)$$

A single phase mixture of solvents may be suitable as a polymer dispersing solvent for a polymeric acid precursor given that the mixture solubility parameters follow the same matching rules provided for individual solvents, irrespective of whether all or none of the solvents in the mixture could be individually selected as polymer dispersing solvents.

Other solvents or mixtures of solvents not specifically mentioned with matching solubility parameters to the polymer may be used as the polymer dispersing solvents to dissolve the polymeric acid precursor.

The solvent selection of a suitable polymer dispersing solvent for the polymeric acid precursor also will be affected by the application for the solution or emulsion. Factors that affect such selection may include the total amount of acid released from the solution when degraded, alkyl chain length and solution viscosity.

The polymeric acid precursors may be dissolved by the polymer dispersing solvents described so that they are no longer in solid form. As used herein, dissolving of the polymeric acid precursor in the polymer dispersing solvent is distinguished from the "degradation" of the precursor through a hydrolysis or transesterfication process that results in the generation of the monomeric organic acids derived from the polymeric acid precursors. The dissolution process involves a true molecular solution of the polymeric acid precursor in the polymer dispersing solvent in such a way that only a negligible decrease of the molecular weight of the polymer may be observed, as well as a negligible increase of the monomeric organic acid content. Accordingly, as used herein, the terms "dissolve," "dissolving" and like expressions are meant to refer to the dissolving of the solid polymeric acid precursors so that they are no longer in solid form within the solvent, while essentially remaining in their polymeric form.

Similarly, as used herein, the terms "degrade," "degrading," and like expressions with reference to the polymeric acid precursor, are meant to refer to the formation of the monomeric organic acids that result from total hydrolysis of the of the polymeric acid precursors. Oligomers of the monomer may be formed due to partial degradation of the polymer, as well.

Many commercially available solid polymeric acid precursors may not readily dissolve in the polymer dispersing solvents, particularly those that are highly crystalline or have high molecular weights. It may therefore be necessary to modify the polymeric acid precursor by reducing its molecular weight. If necessary, different methods may be employed for reducing the molecular weight of the polymeric acid precursor. These include partial ester hydrolysis, acid and alcohol mediated transesterfication and ammonolysis reactions, wherein the polymeric acid precursor polymer chains are broken into smaller polymer chains or oligomers. Different molecular weight reducing agents or reactants may be used to carry out these reactions. The particular type of molecular weight reduction may also facilitate end group control. Thus, with acid hydrolysis the end groups are —$CO_2H$, with bases they are $CO_2$—, with transesterfication they are —$CO_2R$, where R is an alkyl, alkyl aryl, etc., with ammonolysis they are —$CONH_2$.

Partial ester hydrolysis can be obtained at relatively low temperatures in the presence of traces of water. Protic and aprotic catalyst and reactants can be used to obtain this hydrolysis. Partial ester cleavage can also be obtained in the melt in essentially water-free environments. Water strongly increases the decomposition rate. Protic catalysts or reactants can be used to obtain this molecular weight decrease. For partial ester hydrolysis and transesterfication, these agents may include acids, acid generating species, bases, base generating species and catalysts. Non-limiting examples of suitable acids include strong mineral acids, such as sulfuric acid, hydrochloric acid, phosphoric acid, paratoluene sulphonic acid, methane sulphonic acid, organic acids, such as acetic acid, formic acid, oxalic acid, benzoic acid, acid bearing ion exchange resins, styrene sulphonic acid copolymers, vinyl sulfonic acid copolymers and acid clay. Non-limiting examples of acid generating species include anhydrides, such as maleic anyhydride and phthalic anhydride. Strong acids may only be used in small catalytic quantities or they may drive the hydrolysis reaction to completion, that is the polymer is completely, or nearly completely hydrolyzed down to its monomers.

Non-limiting examples of suitable bases or base generating species for ester hydrolysis include sodium hydroxide, ammonia, triethanolamine, ammonium carbonate, hexamethylene tetramine (HMTA), sodium carbonate, sodium bicarbonate, and those organic compounds capable of generating secondary and tertiary amines. Bases and base precursors are typically used in stoichiometric quantities.

For transesterfication, alcohols or acids are present instead of water. Suitable alcohols include methanol, ethanol, isopropanol and other sterically unhindered alcohols and combinations of these. In transesterfication, stoichiometric quantities of alcohol are typically used, since only a few bonds are ruptured to facilitate molecular weight reduction. Examples of suitable acids include acetic acid and propionic acid. Combinations of acids may also be used. Transesterfication may have particular utility in molecular weight reduction because the reaction can be controlled more readily due to fewer reactive groups. Catalysts, such as titanium tetraisopropoxyde and titanium tetraphenoxide, can also be used to provide lower molecular weight.

In ammonolysis, the reaction is similar to hydrolysis, however, ammonia or an ammonia precursor is used as the molecular weight reducing agent. Examples include ammonia, ammonium hydroxide, ammonium carbonate, HMTA, and those organic compounds capable of generating secondary and tertiary amines. In ammonolysis, the ammonia or ammonia precursor is used in stoichiometric quantities.

In the molecular weight reduction reactions, the solid polymeric acid precursor may be mixed with a polymer dispersing solvent and the molecular weight reducing agent. The polymeric acid precursor may be used in an amount to provide from greater than 0% to less than about 100% of the polymer by weight of the polymeric acid precursor/solvent solution. It is contemplated that even 100% of the polymer may be used where it forms a liquid polymer, such as polymeric acid precursors that have a low melt viscosity, which may be liquefied at high enough temperatures and pressures. Polymer solutions containing the acid precursor in an amount of from about 20% to about 60% by weight of the precursor/solvent solution have been found to be suitable for many applications. Heating and mixing of the mixture may be used to facilitate the reactions. Temperatures of from about 60 to about 90° C. have been found to be suitable. The amount of molecular weight reducing agent and solvent used may be adjusted to provide a desired final viscosity of the polymer solution. The reactions may be carried out for several minutes to several hours until the polymer molecular weight is reduced sufficiently. The extent of molecular weight reduction may be estimated from the molar ratios of polymer and acid, alcohol, water, or ammonia added to the reaction. Molecular weight reduction will likely follow the well known Flory-Stockmayer kinetics. A catalyst quencher, such as a base for an acid catalyst, an acid for a base catalyst, etc. may be selected and added to the solution or melt when the required molecular weight is obtained, to halt further molecular weight reduction. Additional solvent may be added to the solution after the reaction is complete to provide a selected concentration of polymeric acid precursor or solution viscosity if desired.

The polymeric acid precursor solutions may be used as is or in an emulsion. Dibasic esters, monoesters and methylisobutyl ketone have low miscibility with water and tend to form stable emulsions. Additionally, dibasic esters are particularly well suited for many applications, particularly those used in treating subterranean formations. This is because the dibasic esters also are hydrolyzable so that they may be broken down into their components (dibasic acid and alcohol). This makes them more environmentally friendly and easier to clean up after use. The hydrolysis of the dibasic esters also results in further acid formation, which may be useful in certain instances.

In forming emulsions with the polymeric acid precursor/dispersing solvent solution, the polymer solution may be used as either the internal or external phases in combination with a substantially immiscible liquid. The emulsions may be stabilized with different emulsifiers or surfactants and stabilizers. These surfactants and stabilizers and their quantities may be selected based upon the type of emulsion being prepared and the desired emulsion stability. Based on the well known hydrophile-lipophile balance (HLB) number, which is an indication of the relative strength of the hydrophilic and hydrophobic portions of the surfactant molecule, surfactants having a low HLB number, for example about 3 to about 6, may be used in forming stable oil continuous phase emulsions. Surfactants with a high HLB number (e.g. 10 or more) may be used in forming stable water continuous phase emulsion. With dibasic ester emulsions, the surfactants may be cationic, anionic, zwitterionic or non-ionic surfactants.

If used, suitable surfactants useful for stabilizing the polymer solutions as the internal phase of the emulsions include, but are not limited to, quaternary ammonium salts, betaines, sulfobetaines, sulfonates, sulfates, amineoxides, fatty acids, fatty acid salts, amine oxides, polypropylene glycol and derivatives, ethoxylated surfactants and combinations of these. The surfactants may be used in amounts of from greater than 0% to about 10% by weight of the emulsion. These are typically added to the aqueous liquid phase when they are water soluble and to the organic phase when they are oil soluble.

In addition, the emulsions may be stabilized with "steric stabilizers," such as block copolymers of propylene and ethylene in combination with acrylic acid, ethylene oxide or propylene oxide or mixtures thereof; polysaccharides (for example, starch, hydroxyethyl cellulose, guar gum and derivatives); polyvinyl acetate/alcohol copolymers and styrene maleic anhydride copolymers, and other suitable amphiphilic polymers. The steric stabilizers may be used in amounts of from 0.1% to about 5% by weight of the emulsion. These are typically added to the aqueous liquid phase when they are water soluble, and may be added to the organic phase, when they are preferably oil soluble. The emulsion may also be stabilized with fibers (such as hydrophilic fibers), platelets, small particles, powders and similar materials.

In oil-in-water emulsions where the polymeric acid precursor/polymer dispersing solvent solution forms the internal phase and a substantially immiscible aqueous liquid forms the continuous external phase, the polymeric acid precursor/dispersing solvent solution may be used in an amount of from about 1% to about 80% by weight of the emulsion. More typically, the polymer solution will be used in an amount of about 10% to about 70% by weight of the emulsion and the polymer solution may contain from about 10% to about 50% by weight of the polymer, more typically from about 10% to about 20% by weight of the polymer. Oil-in-water emulsions may be particularly useful in downhole applications for treating subterranean formations because the water external phase typically has lower friction compared to the internal organic phase, and is therefore more readily pumped and easily placed. It should be noted that the use of the term "oil" with reference to the emulsions (e.g. "oil-in-water emulsions") described herein is used for ease of description, and is meant to refer to the organic phase of the emulsion, such as the organic solvents described herein, and is not necessarily meant to refer "oil" as this term may be commonly used.

In downhole applications, the emulsions may be stabilized without the need of the addition of external surfactants, as surface active oligomers can be generated in situ. This may be accomplished by neutralization of the terminal acid moiety of the dissolved polymeric acid precursor. Neutralization may be carried out by the addition of a suitable base such as ammonia, amines, triethanolamine, tertiary amines or combinations of these to the immiscible solvent, which generally can be an aqueous media, water or brine. The emulsions can also be stabilized with the use of external surfactants and/or steric stabilizers, such as those described previously, in combination with surface active oligomers generated in situ.

The continuous aqueous liquid phase of the oil-in-water emulsions of the invention may also include various compounds or additives to provide certain desired properties or characteristics. These may include viscosifying agents such as a viscoelastic surfactant, such as those described in U.S. Pat. No. 6,258,859, which is incorporated by reference. The viscosifying agent may be a polymer that is either crosslinked or linear, or any combination thereof. When incorporated, the polymer based viscosifying agent may be present at any suitable concentration. Polymer based viscosifying agents useful in the fluids include natural polymers, derivatives of natural polymers, synthetic polymers, biopolymers, and the like, or any mixtures thereof. Some nonlimiting examples of suitable polymers include guar gums, high-molecular weight polysaccharides composed of mannose and galactose sugars, or guar derivatives such as hydroxypropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as viscosifying agents as well. Synthetic polymers such as, but not limited to, polyacrylamide and polyacrylate polymers and copolymers are used typically for high-temperature applications. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in U.S. Pat. Pub. No. US2004/209780, Harris et. al.

In some embodiments, the viscosifying agent may be a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8th Polymers for Adv. Technol. Int'l Symp. (Budapest, Hungary, Sep. 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

The emulsions may be prepared with heating and mixing. Temperatures of from about 25° C. to about 95° C. may be used. Higher temperatures may be used under pressure when melt oligomers are used.

The stability of the emulsions may vary and the emulsions may be formed to provide different stabilities based upon their use. The term "stability" as it relates to emulsions, for instance for an oil-in-water emulsion, to the time required for a substantial amount of the oily phase, in this case the polymeric acid precursor/polymer dispersing solvent, to no longer remain dispersed in the aqueous phase and to form a continuous layer. The stability of aqueous dispersions is a well known art. In general, the formation of a suitable potential barrier between the different dispersed "droplets" or "particles" provides suitable stable emulsions. The nature and extent of this potential barrier is altered by the nature and concentration of the surfactants and stabilizer included in the formulation, and the viscosity of the aqueous fluid, and is generally well described by the well known DVLO and HLB theories.

Stability of the emulsion comes into play when it is desired to invert the emulsion so that the internal phase becomes external to release the dissolved polymeric acid precursor. In treating subterranean formations, the emulsion may be stable at surface conditions for a certain period of time. For example, some emulsions may have stabilities of 10 minutes or less, while others may be stable for several hours (e.g. 3 to 4 hours) or weeks. The long term stability of the emulsions can be tuned by the appropriate choice of a buffer and a selection of the surfactant or steric stabilizer packages from hours into days, weeks or months. The emulsions can be prepared well in advance to the moment they will be pumped downhole, for which shelf life stability of various months is required, or be prepared on locations by means of a suitable mechanical device such a high speed stirrer or a high pressure emulsion generator. Once in place within the formation, however, the emulsions may invert so that the polymeric acid precursor is released to form acid, as is discussed more fully below. Emulsions that are less stable may not provide sufficient time to properly place the emulsion within the formation.

In water-in-oil emulsions where the polymeric acid precursor/polymer dispersing solvent solution constitutes the continuous external phase and an aqueous liquid forms the internal phase, the polymeric acid precursor/polymer dispersing solvent solution may be used in an amount of from about 30% to about 90% by weight of the emulsion. These emulsions may tend to be very viscous. Typically, the polymeric acid precursor/polymer dispersing solvent solution will be used in an amount of about 35% to about 70% by weight of the emulsion. The polymer may be present in an amount of 10% to about 40% or about 50% or more by weight of the emulsion. Suitable organic solvents for use in water-in-oil emulsions include DBE-4, DBE-5 and mixtures of DBE-5 and DBE6 (e.g. 75 wt % DBE-5+25 wt % DBE-6). For water-in-oil emulsions, the molecular weight of the polymeric acid precursor may be reduced, for example, with ammonium carbonate, sulfuric acid and potassium carbonate. If used, the surfactants for water-in-oil emulsions may be the same as used for the oil-in-water emulsions previously described. The surfactants may be used in amounts of from greater than 0% to about 3% by weight of the emulsion. Suitable surfactants may include, but are not limited to, sulfonates, ethoxylated surfactants and combinations with cationic surfactants and combinations of these. One particularly suitable surfactant is trimethyl octadecyl ammonium chloride, which is commercially available from Akzo Nobel as ARQUAD T-50. This surfactant is particularly useful with polymeric acid precursors with molecular weights reduced with $(NH_4)_2CO_3$.

Additionally, the emulsions may be stabilized with steric stabilizers, such as block copolymers of propylene and ethylene in combination with acrylic acid, ethylene oxide or propylene oxide or mixtures thereof; polysaccharides (for example, starch, hydroxyethyl cellulose, guar gum and derivatives); polyvinyl acetate/alcohol copolymers and styrene maleic anhydride, hydrophobic powder, particles and fibers another suitable water soluble amphiphilic polymers.

In water-in-oil emulsions, the internal aqueous liquid phase may include water or other aqueous liquids. Examples of aqueous liquids that may be used for the internal phase include aqueous solutions containing mineral acid, organic acids or acid generating species, bases or base generating species, oxidizers, enzymes, chelating agents, polymer crosslinking agents and crosslinking agents.

In certain embodiments of the invention, the polymeric acid precursor/polymer dispersing solvent solutions or emulsions prepared from these solutions may be energized or foamed with a gas or supercritical fluid, such as nitrogen or carbon dioxide, which may form a separate "gas" phase. They may also include particulate materials, such as thermoplastic or thermosetting polymer pellets, fibers or grains, glass bubbles, minerals, silicates, naturally occurring clays, ceramic materials, wood, chestnut or walnut crust, sand, proppant, bauxite, and resin coated particles.

Degradation of the dissolved polymeric acid precursors to provide useful acids for treating subterranean formations and the like may be accomplished in a similar manner to those described for the solid polymeric acid precursors in U.S. Patent Publication No. US2004/0152601A1. The degradation of the solid polymeric acid precursors differs from that of the dissolved polymeric acid precursors because takes place of the surface of the solid polymer. In the emulsion, the polymer is in an organic liquid phase and the droplets are much smaller, resulting in an increased rate of hydrolysis due to higher diffusion rates. The organic phase droplets in the emulsion also contain some amount of water (e.g. ~5% by weight), facilitating hydrolysis within the droplets. If an accelerant, such as those described in U.S. Patent Publication No. US2004/0152601A1, is not used, the reaction rate may be very slow, however, acid end groups are still formed at the slow reaction rates. Acid end groups increase reaction rates. The use of accelerants will increase the rate of reaction.

In oil-in-water emulsions, the emulsion is inverted so that the polymeric acid precursor is external and may react or hydrolyze with water to form acid, which then reacts at a controlled rate. This is in contrast to conventional emulsified acids that tend to react immediately upon inversion of the emulsion. The dissolved polymeric acid-precursors, however, may tend to hydrolyze more readily than the solid form acid precursors.

The stability of the oil-in-water emulsion can be tuned such as to inverse the emulsion based on the salinity, pH, or temperature of the formation, to trigger the degradation of the polymeric acid precursor. In some applications, the emulsion does not need to be inverted, as the downhole conditions (temperature, pH, salinity) allow for some of the polymer dispersing solvent to diffuse out of the internal phase of the emulsion, as well as some of the water to enter the internal phase and trigger the degradation of the polymeric acid precursor. As soon as the emulsion is subjected to downhole conditions, the polymeric acid precursor will start to decompose.

The emulsion may contain a sufficient quantity of water to hydrolyze all the polymer, as well as the solvent. As an example, a typical emulsion may contain 20% polylactic acid, 50% DBE-5 and 30% water. To obtain one mole of monomeric lactic acid, one mole of water is needed. To hydrolyze one mole of DBE-5, two moles of water are needed. Assuming there is 100 g of the emulsion, then:

$$n(H_2O)=m(H_2O)/M(H_2O)=30/18=1.67 \text{ mol } H_2O \text{ in the emulsion;} \qquad (7)$$

$$n(\text{lactic acid precursor})=m(\text{lactic acid precursor})/M \text{ lactic acid precursor})=20/(12*3+16*2+4)=0.28 \text{ mol lactic acid precursor; and} \qquad (8)$$

$$n(\text{DBE-5})=m(\text{DBE-5})/M(\text{DBE-5})=50/(12*7+16*4+17)=0.31 \text{ mol DBE-5.} \qquad (10)$$

To hydrolyze all the ester's bonds, 0.9 mol $H_2O$ are needed:

$$0.9 \text{ mol } H_2O=n(H_2O)=n(\text{lactic acid precursor})+2*n(\text{DBE-5})=0.28+2*0.31. \qquad (11)$$

So there is a sufficient quantity of water to hydrolyze all the ester's bonds in the emulsion. When polylactic acid hydrolyzes its solubility strongly increases in water, lactic acid oligomers and lactic acid dissolve in water and react with the formation. Consequently, phase inversion is not a necessary condition for acid generation.

An accelerant agent ("accelerant"), which may be carried in the initially external aqueous phase, may be used to facilitate the dissolution process; thereafter it may proceed without any added agent. On the other hand, if there is additional agent present, since it reacts readily with the polymeric acid precursor it will accelerate the continuing degradation process. This is the "accelerant" mechanism. The accelerant does not consume all of the acid generated; but causes more rapid generation of more acid by disrupting the polymeric acid precursor structure. Note that the formation itself can act as a solid accelerant. Furthermore, the action of accelerants may be delayed, for example, if they are slowly soluble solids or if they are chemically bound in a liquid chemical that must be hydrolyzed to release the agent. One polymeric acid-precursor may be an accelerant for another; for example, PGA accelerates the hydrolysis of PLA. The timing and rate of degradation of the acid-precursor to acid may be controlled by these techniques.

To accelerate the degradation of the dissolved polymeric acid precursors, water-insoluble, acid-soluble solid materials or water-soluble, acid-reactive solid materials, such as but not limited to solid magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into the emulsions or polymer solutions. At least a portion of the polymeric acid precursor slowly hydrolyzes at controllable rates to release acids at pre-selected locations and times in the fracture.

The degradation of the polymeric acid precursors may also be accelerated by the addition of certain water soluble liquid additives. These accelerants may be acids, bases, or sources of acids or bases. These are particularly valuable at low temperatures (for example below about 135° C.), at which some of the polymeric acid precursors hydrolyze slowly, relative to the time an operator would like to put a well on production after a stimulation treatment. Non-limiting examples of such soluble liquid additives that hydrolyze to release organic acids are esters (including cyclic esters), diesters, anhydrides, lactones and amides. A compound of this type, and the proper amount, that hydrolyzes at the appropriate rate for the temperature of the formation and the pH of the fluid is readily identified for a given treatment by simple laboratory hydrolysis experiments. Other suitable soluble liquid additives are simple bases. (They are termed "liquids" because in practice it would be simpler and safer to add them to the fracturing fluid as aqueous solutions rather than as solids.) Suitable bases are sodium hydroxide, potassium hydroxide, and ammonium hydroxide. Other suitable soluble liquid additives are alkoxides, water-soluble carbonates and bicarbonates, alcohols such as but not limited to methanol and ethanol, alkanol amines and organic amines such as monoethanol amine and methyl amine. Other suitable soluble liquid additives are acids, such as but not limited to hydrochloric acid, hydrofluoric acid, ammonium bifluoride, formic acid, acetic acid, lactic acid, glycolic acid, aminopolycarboxylic acids (such as but not limited to hydroxyethyliminodiacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. (Ammonium bifluoride partially hydrolyzes in contact with water to form some HF, and so will be called an acid here.) The organic acids may be used as their salts. When corrosive acid might contact corrodible metal, corrosion inhibitors are added.

The dissolved polymeric acid precursors degrade in situ, that is, in the location where they are placed (deliberately or inadvertently). Additionally, the dibasic ester solvents used in dissolving the polymers can also hydrolyze, if selected among groups of monobasic esters or dibasic esters, and decompose forming useful acids, which can be used to treat the formations as well. The acids produced from the polymeric acid precursors and the solvents are generally non-toxic and environmentally safe.

The polymeric acid precursor/polymer dispersing solvent solutions can be used for multiple downhole applications as a straight solution or in an emulsion. The straight solution or emulsion can be pumped downhole as such. The pumping can be done "on the fly" or through one or various buffering tanks, to allow for sufficient dispersion or predegradation time at the surface temperature. The solutions or emulsions may be pumped at rates below the fracture gradient of the reservoir (as acidizing treatments, squeeze treatments, or gravel packing treatments) or above the fracture gradient of the reservoir as fracturing treatments, acid fracturing treatments of frac and pac treatments. The solution or emulsion may be introduced into the wellbore through tubing, selected from coiled tubing and jointed tubing, positioned in the wellbore or in the annular space defined by the tubing and the wall of the wellbore. Another fluid may be introduced into the other of the tubing or annular space in certain applications.

The polymeric acid precursor solutions and emulsions of the invention may have a variety of applications. It will be apparent that the polymeric acid precursor solutions and emulsions may have similar applications to those where solid acid precursor systems are used, such as described in U.S. Patent Publication No. US2004/0152601A1, where delayed formation of acid is desired. The solutions and emulsion systems of the present invention may be particularly useful in treating formations of limited porosity, where solid acid precursors would screen out of the carrier fluid. In one particular application, solid acid precursors may be used in combination with the described polymer solutions and emulsions, with the dissolved polymer solution or emulsion acting as a carrier fluid for the solid acid precursor.

In acid fracturing, it is well know by practitioners familiar with the art that emulsions can be used for acid fracturing applications. Typically an aqueous phase solution of an acid, most commonly hydrochloric acid but others can be used, is the discontinuous phase of the emulsion (the internal phase), and the continuous external phase of the emulsion is composed of diesel, oil, or some other immiscible hydrocarbon. The emulsion is normally stabilized by added surfactants. The primary advantage of the emulsion is that the reaction of the acid with either the well bore, or the surface of the fracture is delayed by the physical barrier of the continuous hydrocarbon phase. A second advantage of these emulsions is that the viscosity of the emulsion can be used to optimize the fracture geometry. First, the viscosity and multiphase structure of the emulsion help to minimize the leakoff of the fluid into the formation. Thereby more fluid is retained in the fracture where it can potentially be of the most benefit etching the surfaces. Second the higher viscosity of the emulsion can help to create more width during pumping. Combined with other engineering practices familiar to practitioners, this can be used to the engineer's advantage in designing and executing treatments.

One of the disadvantages of the hydrocarbon external acid fracturing fluids, is that they tend to have high friction pressure during pumping. This can decrease the rate at which a treatment can be pumped, and it can require that additional pumps be brought to location—increasing the cost and complexity of the service. Whereas the friction pressure of aqueous fluids, or of emulsions with an aqueous external phase can be reduced by adding dissolved polymers and or viscoelastic surfactants (known by practitioners as friction reducers), the ability to reduce the friction pressure of hydrocarbon fluids is much more limited.

The emulsions of the invention have particular application in acid fracturing. As an example, where a polylactic acid is dissolved in a dibasic ester, and subsequently emulsified with water containing a guar based friction reducer, the acid is further delayed. As in the case of prior emulsions, the new system is multi-phase, and the reactive species are not in physical contact with the surface of the fracture until the emulsion breaks, or until hydrolyzed acid diffuses out of the internal phase to the surface of the fracture. The polylactic acid polymer and the dibasic ester have to undergo hydrolysis before the acid is created in the first place and they can react with the surface of the formation. The system also has an aqueous external phase, and thereby will have lower friction pressures for pumping. When the emulsion breaks, and the polymer solution is exposed to the aqueous environment, the PLA can come out of solution, forming solid or amorphous films. These films can be useful for controlling fluid loss during the operation. Furthermore, since the emulsion has a significant viscosity it can be used to carry additional solid acid particles, thereby increasing the entire acid load of the system, and be able to react with more carbonate.

The solutions and emulsions may be used as a diverting agent for many types of downhole applications and as temporary plugging agents for wellbore, perforations, matrix treatments and natural fractures. The solutions and emulsions may initially be very viscous. As the polymeric acid precursors break down into acids that may react further with any acid reactive materials, the plugging or diverting function may be temporary. Additionally, as described previously, the dibasic ester solvents used for emulsions will also be hydrolyzed. This makes the use of these fluids beneficial in that they are easy to clean after treatment.

Occasionally there arises occasions during the completion and construction of subterranean wells where a high permeability formation, or a hydraulic fracture that has been completed, or a gravel pack needs to be sealed off and protected. For example often a hydraulic fracture is created in a productive formation. Subsequent to its placement, a submersible pump or production tubing is run into the well. Before this operation a kill fluid is placed into the well for pressure and blowout control purposes. Often this kill fluid is dirty, and if it leaks off into the fracture it can damage the conductivity of the fracture. It is therefore may be desirable to seal off the perforations and near well bore region of a fracture with a temporary sealing agent that can prevent this damage, without causing long term damage of its own.

In some formations multiple fractures are placed in the same wellbore. Usually it is advantageous to hydraulically isolate an already placed fracture from a subsequent treatment. That is, once a hydraulic fracture is completed it is advantageous to isolate it by a bridge plug, a sand plug, a fiber plug or some other system that will prevent subsequent treatment from disturbing the previously executed treatment (especially to prevent subsequent treatments from over displacing the sand in the fracture).

As an example of another application, a polylactic acid is dissolved in a dibasic ester, and subsequently emulsified with water containing a guar based friction reducer. This material can be pumped down a coiled tubing into a well bore at high pressure, squeezing it into perforations and or a hydraulic fracture. As the emulsion breaks, the polymer solution gets exposed to the aqueous environment causing at least some of the PLA to precipitate out of solution, forming solid or amorphous films. These films deposit on the perforations or in the high porosity sand pack, effectively sealing off the fracture from further fluid penetration.

The effectiveness of this type of treatment can be modified and potentially improved, depending on the specific wellbore and formation conditions by using this emulsion with other solid materials (bridging agents) such as fibers (both organic and inorganic), flakes, ribbons, sized calcium or magnesium carbonates, silica flour, sand, etc. In another application, the emulsion containing dissolved PLA could be pumped down coiled tubing or the work string, and the solid state bridging agent could be pumped down the annulus. The pumping scheduled could be reversed with the emulsion being pumped down the annulus, and the bridging agent slurry down the coiled tubing or work string.

As a viscous fluid, the emulsion can mitigate against fluid loss by its very nature if it leaks off hole into high permeability formations or into naturally occurring fractures. The stability of an emulsion can be affected by many physical and chemical factors. Shear rate, temperature, the addition of salts, the change in the surfactant package all can affect the emulsion stability. One application is to take advantage of emulsion breaking for certain fluid control applications. As an example, polylactic acid is dissolved in a dibasic ester, and subsequently emulsified with water containing a guar based friction reducer. As the emulsion breaks, the polymer solution gets exposed to the aqueous environment causing at least some of the PLA to precipitate out of solution, forming solid or amorphous films. These films deposit on the surface of the porous rock during leakoff, effectively hindering further fluid loss. Depending on the temperature and formation conditions, the lifetime of this deposited film can range from minutes to days. The localized reduction in permeability caused by the precipitated polymer is temporary. Long term damage to the permeability of either the formation, or of the fracture is minimal since the polymer will undergo further hydrolysis to completely soluble lactic acid, or lactate salts. The size of this pill can be readily engineered by one skilled in the art of hydraulic fracturing.

The emulsion may be used by itself or in combination with other acid fluid systems, diverting stages, or self diverting fluids for matrix acidizing applications. The high viscosity of the emulsion and the deposited PLA serve as diverters, causing the fluid to be diverted to lower permeability regions in the formation.

The solutions and emulsions may be used as fluid loss system or in a combined fluid loss and matrix breaker pretreatment system for a viscoelastic surfactant fluid system (VES) in foamed and non-foamed fracturing applications, gravel packing applications, and frac and pac applications. For the fluid loss application, emulsions with appropriate particle size distributions are selected, or solutions that when pumped together with a typical VES fluid form dispersed phases of sizes capable of preventing the invasion of the formation, as to reside in the face of the fracture. For the fluid loss and matrix breaker combined application, the emulsions with appropriate particle size distributions are selected, or solutions that when pumped together with a typical VES fluid form dispersed phases of sizes capable of partially migrating with the surfactant into the formation, and partially preventing the invasion of the formation, as to reside in the face of the fracture. These emulsions and solutions can be pumped in the pad stage or through out during the fracturing treatment The solutions and emulsions may also be used as a temporary plugging agent alone or when combined with polysaccharide solutions, inorganic salts, waxes, fibers, or carbonate or bicarbonate materials, where the acids formed from the polymeric acid precursors eventually breakdown these systems.

The solutions and emulsion systems may be used for soaking and cleaning of oil based drilling fluids and for cleaning wellbores.

The solutions and emulsions may be used as a fluid loss agent for aqueous polysaccharide linear or crosslinked fluids (straight or foamed) for fracturing applications. The emulsions is formed with appropriate particle size distributions or solutions that, when pumped together with a typical fracturing fluid, form dispersed phases of sizes capable of preventing the invasion of the formation, as to reside in the face of the fracture, and remain in the filter cake. In one application, the systems may be used as a combined fluid loss and matrix breaker pre-treatment system for polysaccharide-based fracturing fluid applications. The emulsions is formed with appropriate particle size distributions or solutions that, when pumped together with a typical fracturing fluid, or by itself as an early stage in the fracturing treatment, form dispersed phases of sizes capable of partially migrating with the surfactant into the formation, and partially preventing the invasion of the formation, and remain in the filter cake. These emulsions and solutions can be pumped in the pad stage or through out during the fracturing treatment. One advantage of these emulsions and solutions is that they can, with time, provide enough acid as to break the filter cake, by mean of de-crosslinking or polysaccharide acid degradation.

The polymer solutions and emulsions of the invention may be used for acid delivery for matrix treatments and acid fracturing. For oil-in-water emulsions, the emulsion may be used in combination with conventional acid fracturing treatments, wherein the emulsion may be used as a first stage wherein the emulsion, which may be more viscous, may act as a diverting agent that tends to position itself within high permeable zones. Furthermore, since the emulsion is inherently a "delayed acid" system, the acid is carried deeper into the formation and is less likely to be spent early within the fracture. This may be followed with a conventional acid solution for treating the less permeable zones. For water-in-oil emulsions, these may be used in matrix acidizing treatments wherein the emulsion may be used as a diverter between conventional acid treatments.

The water-in-oil emulsions may also have particular application as an additive that functions as a breaker, as a carrier for scale inhibitors, as a carrier for crosslinking agents and as a delayed release mechanism.

The following examples further serve to illustrate the invention.

EXAMPLES

Example 1

The solubility of PLA in various solvents was evaluated. The PLA used was NatureWorks PLA 4060D, which is an amorphous polylactic acid as described earlier. The PLA was combined with the solvents for 6-7 hours at 70° C. The solvents used and the results are presented in Table 1 below.

TABLE 1

| Solvent | DBE-2* | DBE-4 | DBE-5 | DBE-6 | Acetone | EtOAc |
|---|---|---|---|---|---|---|
| PLA Solubility, wt. % | 10 | 40 | 15 | 5 | 50 | 35 |
| Boiling point, ° C. | >210 | 196 | >210 | >227 | 56 | 77 |
| Flash point, ° C. | 104 | 94 | 107 | 113 | −20 | 2 |
| Vapor Pressure, kPa | $<5 \times 10^{-3}$ | 0.018 | $7 \times 10^{-3}$ | $1 \times 10^{-3}$ | 0.18 | 0.073 |
| Solubility in water, wt % | 4.2 | 7.5 | 4.3 | 2.1 | ∞ | 12 |
| Water solubility, wt % | 2.9 | 3.8 | 3.2 | 2.4 | ∞ | 9.7 |

*DBE-2 = 75% by wt. DBE-5 + 25% by wt. DBE-6

Example 2

A polylactic acid mixture was formed by combining 50% by weight of polylactic acid, available as NatureWorks 4060D polylactic acid and 50% by weight of DBE-4 as the solvent. The PLA polymers were first soaked in the solvent for several hours at a temperature from about 60 to about 80° C. The PLA was completely dissolved and a highly viscous homogeneous solution was formed. This mixture was then used in preparing the solutions of Examples 3-7.

Example 3

The molecular weight reducing agent of a 5 mol % (~<0.0347 mol) triethanolamine was added to an amount of the PLA/DBE-4 mixture of Example 2 to initiate breaking of the polymer chains. This mixture was placed in a water bath at 80° C. After approximately 0.5 hours the viscosity of the mixture decreased significantly, indicating dissolution of the polymer molecules. The pH of the water extract was slightly alkaline.

Example 4

The PLA/DBE-4 mixture of Example 2 was treated with $H_2SO_4$. 10 mol % of $H_2SO_4$ was added to the mixture and showed successful breaking of the polymer, as indicated by a dramatic decrease in viscosity. The pH of the water extract was from about 1-2.

Example 5

The PLA/DBE-4 mixture of Example 2 was treated with a catalytic amount of $H_2SO_4$. Approximately 0.1 ml/50 g PLA of 10% mol $H_2SO_4$ was added to the mixture with very good polymer break. The pH of the water extract was slightly acid.

Example 6

Ammonium carbonate (($NH_4$)$_2CO_3$) was used to reduce the molecular weight of the PLA. Approximately 5-10 mol % ammonium carbonate was added to the mixture of Example 2 to initiate the polymer break. After 40-50 minutes the viscosity of the mixture decreased significantly and had a neutral pH. The solution had the appearance of cream.

Example 7

The PLA of mixture of Example 2 was reduced with NaOH. Approximately 20 mol % of NaOH was added to the mixture. The viscosity of the mixture decreased, however, a precipitate was formed. This may have been due to NaOH precipitating after water was consumed by the DBE-4.

Example 8

A 5 ml/L (0.5 vol. %) solution of a trimethyl octadecyl ammonium chloride surfactant (as 25% water, 25% isopropanol and 50% trimethyl octadecyl ammonium chloride) was prepared in de-ionized water. Pure DBE-4 solvent (0.5 ml) was added with mixing to 5 ml samples of the aqueous solution until very dilute emulsion samples were formed (saturated water with some remaining DBE-4 as a second phase). PLA/DBE-4-in-water emulsions were then formed by adding 10 ml of the PLA:DBE-4 (50:50) solutions prepared in Examples 3-7 to the 5 aqueous emulsion samples using vigorous agitation with a blender cup or an overhead mixer and warming. Each of the PLA/DBE-4-in-water emulsions was stable for at least 15 hours at room temperature.

Example 9

A polylactic acid mixture was formed by combining 40% by weight of polylactic acid, available as NatureWorks 4060D PLA, 30% by weight of DBE-2 and 30% by weight of DBE-6 as the solvent. The PLA polymers were first soaked in the solvent for several hours at a temperature from about 80-90° C. A homogeneous solution was formed. This solution was then used in preparing the solutions of Examples 10-14.

Example 10

A molecular weight reducing agent was first prepared by saturating DI water with ammonium carbonate at room temperature (1 g $(NH_4)_2CO_3$ in 7 ml DI $H_2O$). The solution obtained in Example 9 was diluted two times with DBE-2:DBE-6=1:1 mixture. 2.5 wt % of the ammonium carbonate solution was added to prepared PLA solution and heated for 2 hrs at 90° C. The obtained liquid was Newtonian between shear rates of 0.01-10 $s^{-1}$. The viscosity was less than 1 cP. This liquid was used in preparing emulsions of Examples 15-16.

Example 11

A molecular weight reducing agent was first prepared by saturating DI water with ammonium carbonate at room temperature (1 g $(NH_4)_2CO_3$ in 7 ml DI $H_2O$). The solution obtained in Example 9 was diluted two times with DBE-2:DBE-6=1:1 mixture. 0.5 wt % of the ammonium carbonate solution was added to the prepared PLA solution and heated for 0.5 hrs at 90° C. The obtained liquid was Newtonian between shear rates of 0.01-10 $s^{-1}$. The viscosity was approximately 10 cP.

Example 12

A molecular weight reducing agent was first prepared by saturating DI water with ammonium carbonate at room temperature (1 g $(NH_4)_2CO_3$ in 7 ml DI $H_2O$). 2.5 wt % of the ammonium carbonate solution was added to the PLA solution of Example 9 and heated for 2 hrs at 90° C.

Example 13

A molecular weight reducing agent was first prepared by saturating DI water with potassium carbonate at room temperature (4 g $K_2CO_3$ in 10 ml DI $H_2O$). 0.25 wt % of the potassium carbonate solution was added to PLA solution in DBE of Example 9 and heated for 3 hrs at 90° C. This liquid was used in preparing emulsions of Examples 17.

Example 14

0.05 mol/l sulfuric acid was used as a molecular weight reducer. 2 wt % of sulfuric acid solution was added to PLA solution in DBE of Example 9 and heated for 10 h at 90° C. The solution viscosity was drastically decreased.

Example 15

50 wt % of 2.4 g/L solution of guar in water saturated with DBE-2 was mixed with 50% liquid of Example 10. The mixture was emulsified at 90° C. in the presence of 0.25 wt % of a C6-C10 alcohol ethoxysulphate in an aqueous media. After immediate cooling to room temperature, a stable water continuous phase emulsion was formed. The obtained liquid was non-Newtonian between shear rates of 0.01-1000 $s^{-1}$. The viscosity decreased from 40 cP at 0.01 $s^{-1}$ to 0.02 cP at 100 $s^{-1}$.

Example 16

The liquid of Example 10 was diluted with a DBE-2:DBE-6=1:1 mixture to obtain 33.3 wt % PLA in DBE. To this was added a liquid of 40 wt % of 2.4 g/L solution of guar in water saturated with DBE-2. The mixture was emulsified at 90° C. in the presence of 0.1 wt % of a 25 to 50 wt. % C6 to C10 alcohol ethoxysulfate in aqueous media and 0.4% polypropyleneglycol. After immediate cooling to room temperature, a stable water continuous phase emulsion was formed. The obtained liquid was non-Newtonian between shear rates 0.01-1000 $s^{-1}$. The viscosity decreased from 100 cP at 0.01 $s^{-1}$ to 0.2 cP at 100 $s^{-1}$.

Example 17

33 wt % of 2.4 g/L solution of guar in water saturated with DBE-2 was mixed with 67% of the liquid of Example 13. The mixture was emulsified at 90° C. in the presence of 0.33% of a 25 to 50 wt. % C6 to C10 alcohol ethoxysulfate in aqueous media. After immediate cooling to room temperature, a stable oil continuous phase emulsion was formed. The obtained liquid was non-Newtonian between the shear rates of 0.001-1000 $s^{-1}$. The viscosity decreased from $1*10^5$ cP at 0.01 $s^{-1}$ to 6 cP at 100 $s^{-1}$ Example 18

33 wt % of 2.4 g/L solution of guar in water saturated with DBE-2 was mixed with 67% liquid of Example 11. The mixture was emulsified at 90° C. in the presence of 0.33 wt. % of a trimethyl octadecyl ammonium chloride surfactant (as 25% water, 25% isopropanol and 50% trimethyl octadecyl ammonium chloride). After immediate cooling to room temperature, a stable oil continuous phase emulsion was formed.

The obtained liquid was non-Newtonian between shear rates 0.001-1000 s$^{-1}$. The viscosity decreased from 1*10$^5$ cP at 0.01 s$^{-1}$ to 6 cP at 100 s$^{-1}$ While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A composition comprising:
   an amount of a polymeric acid precursor partially dissolved within a solvent for dispersing a polymer and a liquid that is immiscible with the solvent, wherein the polymer is a polysulphone or polyphosphate and the solvent comprises at least one of dimethyloxalate, dimethyl ester of propanedioic acid, dimethyl maleate, dimethyl malonate, dimethyl succinate, dimethyl glutarate and dimethyl adipate and mixtures thereof.

2. The composition of claim 1, further comprising at least one of a surfactant and a steric stabilizer.

3. The composition of claim 2, wherein: the surfactant has a hydrophile-lipophile balance of from about 6 to about 35.

4. The composition of claim 1, wherein: the solvent comprises an ester that degrades to at least one of carboxylic acids, dicarboxylic acids and polycarboxylic acids.

5. The composition of claim 1, wherein: the solvent comprises at least one of a dibasic ester, a monobasic ester, a ketone, an ether, a non-aliphatic dicarboxylic acid ester, and combinations of these.

6. The composition of claim 1, wherein: the solvent has an absolute difference of the Hansen polar solubility parameter with the polymeric acid precursor of less than about 5 MPa$^{1/2}$ and an absolute difference of the Hansen hydrogen bonding solubility parameter with the polymeric acid precursor of less than about 5 MPa$^{1/2}$ and an absolute difference of the Hansen dispersive solubility parameter with the polymeric acid precursor of less than about 5 MPa$^{1/2}$.

7. The composition of claim 1, wherein: the solvent has a solubility distance, Ra, with respect to the polymeric acid precursor, that is less than 1.1 times the solubility sphere radius, Ro, of the polymeric acid precursor.

8. The composition of claim 1, wherein: the polymeric acid precursor is present within the solvent in an amount greater than 0% and less than 100% by weight of a solution containing the polymeric acid precursor and the solvent.

9. The composition of claim 8, wherein: the polymeric acid precursor is present within the solvent in an amount of from about 10% to about 60% by weight of the solution containing the polymeric acid precursor and the solvent.

10. The composition of claim 1, wherein: the polymeric acid precursor comprises an amorphous solid.

* * * * *